United States Patent Office 3,616,683
Patented Nov. 2, 1971

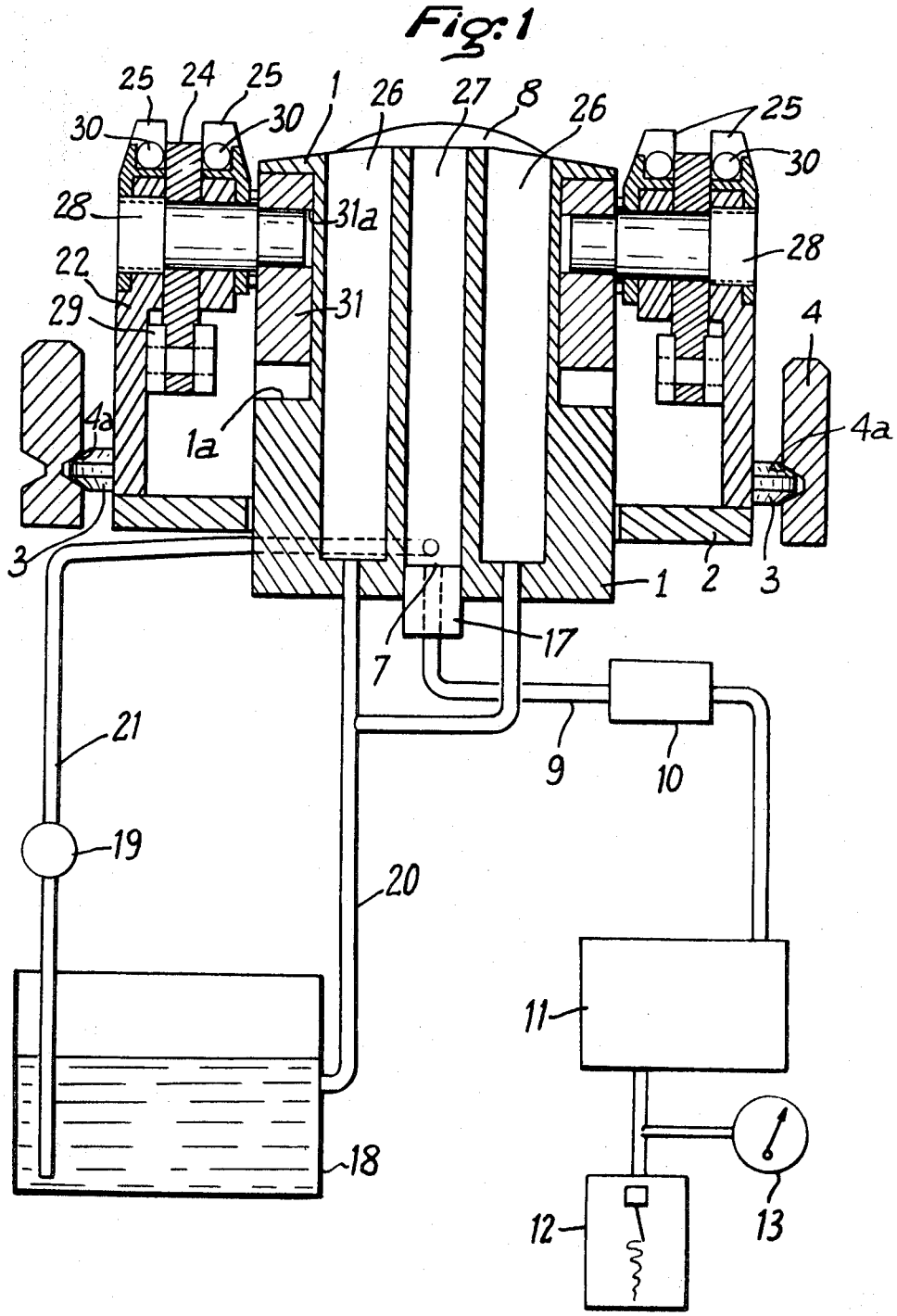

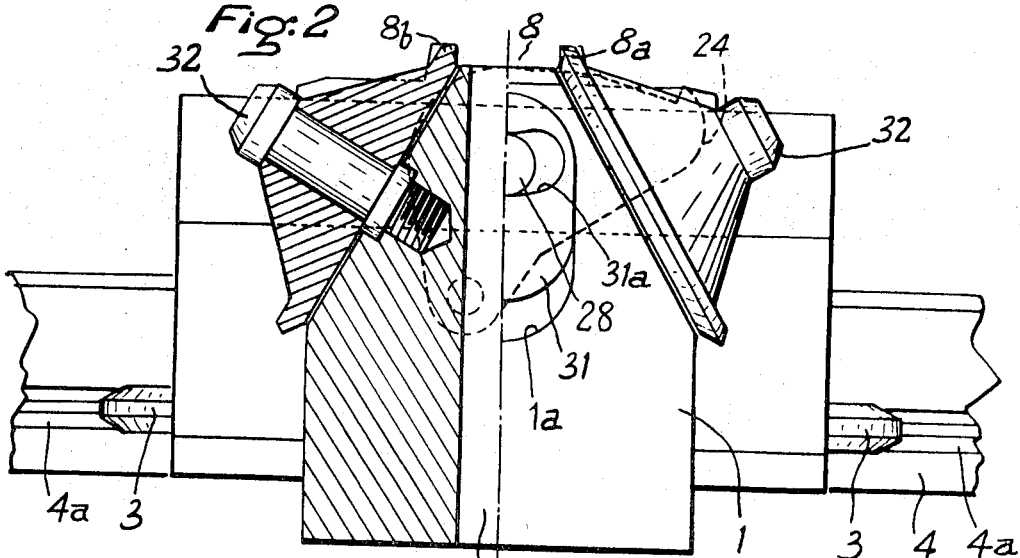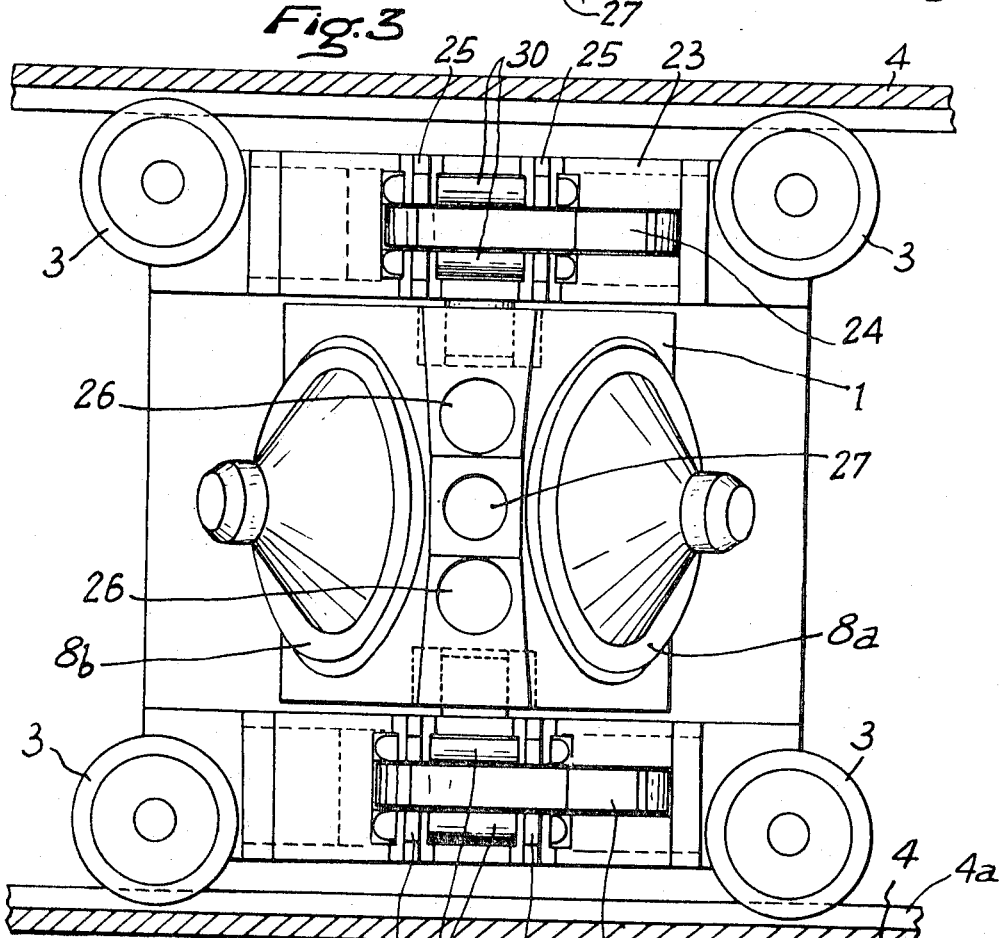

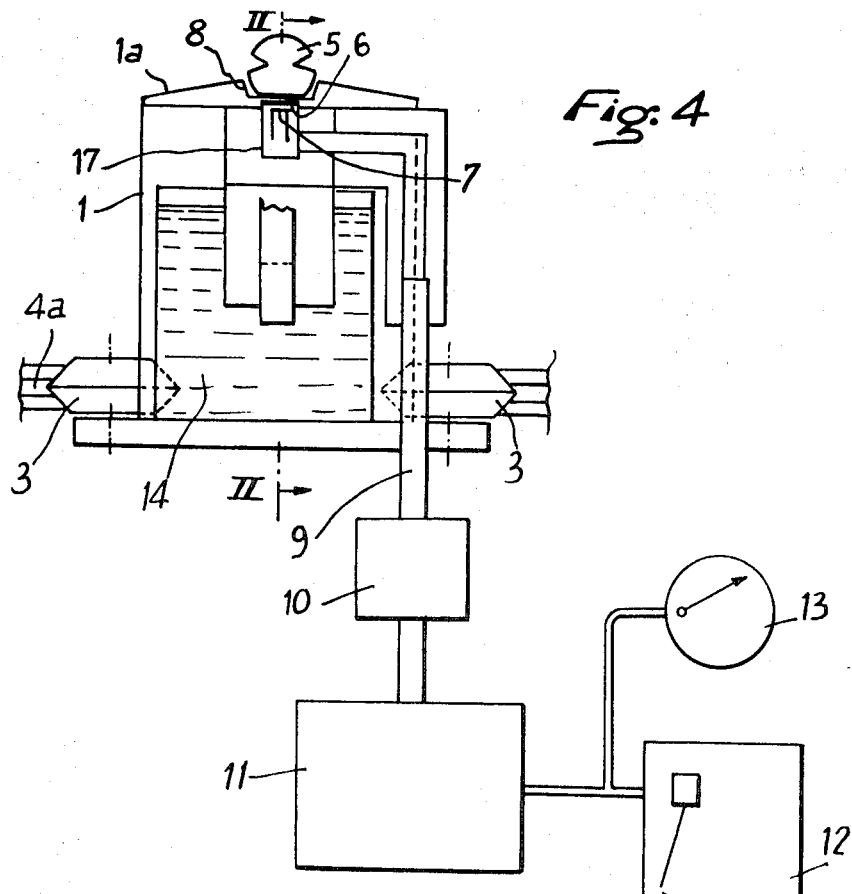
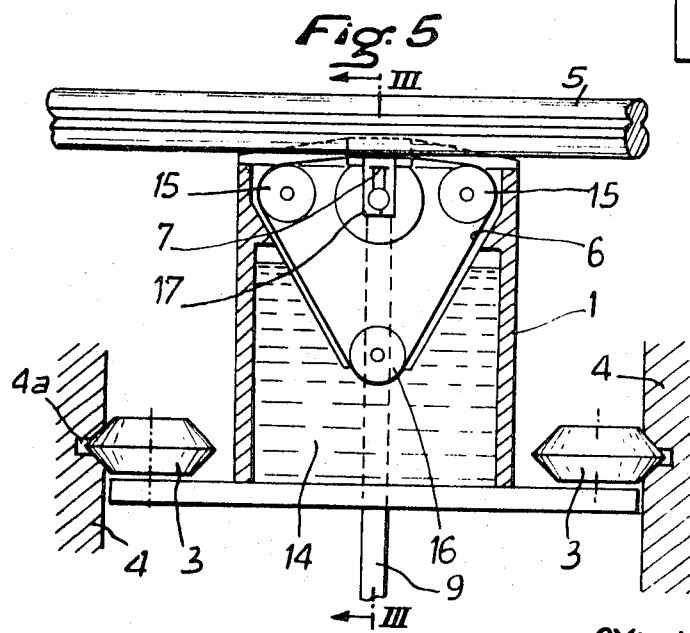

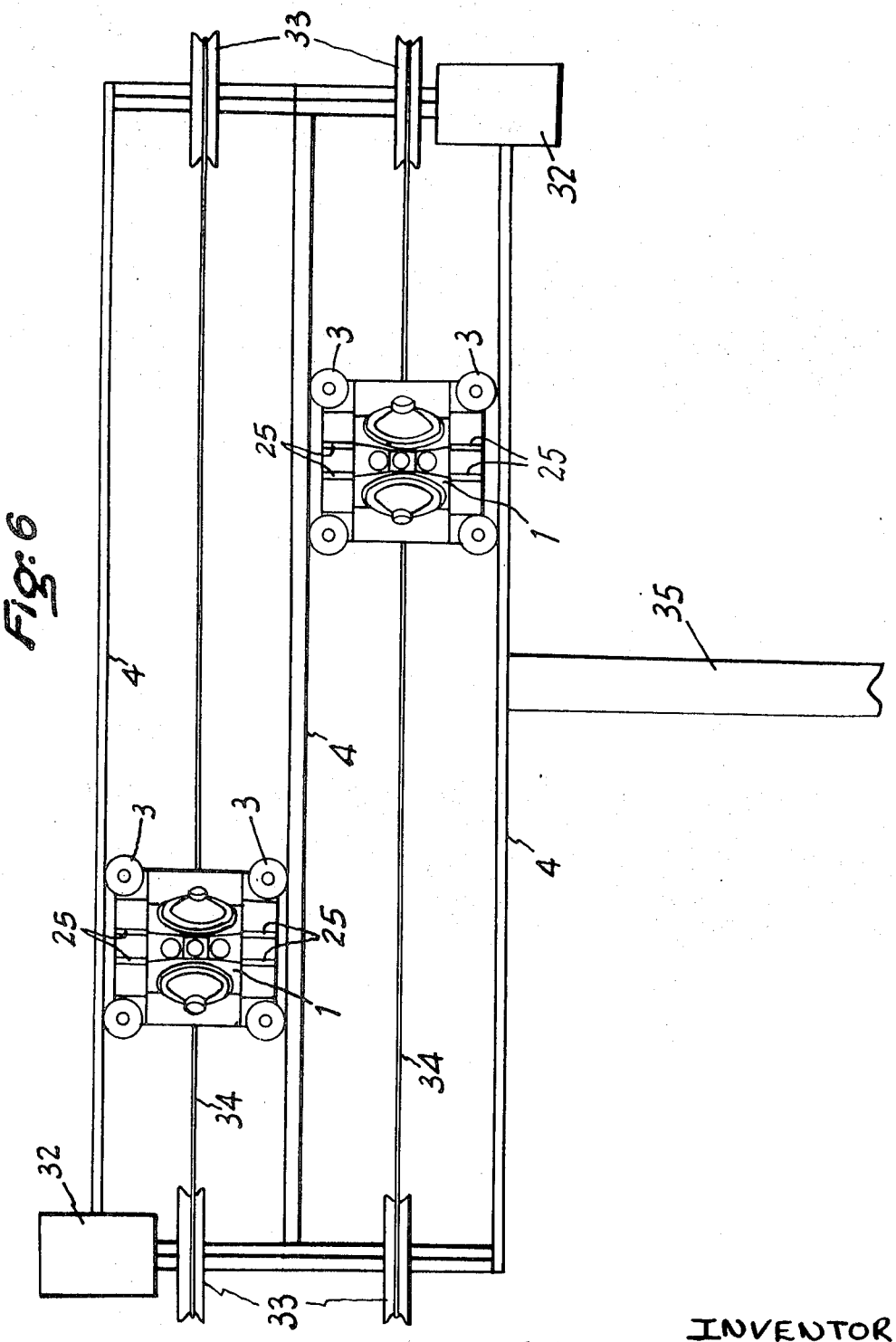

3,616,683
APPARATUS FOR THE CONTINUOUS CHECKING OF OVERHEAD CONTACT LINES FEEDING ELECTRICALLY DRIVEN RAILROAD VEHICLES
Sylvestre Pachurka, Cachan, France, assignor to Societe dite: S.A. Materiels Industriels Matisa, Paris, France
Filed July 2, 1969, Ser. No. 838,506
Claims priority, application France, Dec. 23, 1968, 179,978
Int. Cl. G01n 24/00
U.S. Cl. 73—71.5
3 Claims

ABSTRACT OF THE DISCLOSURE

Apparatus for the continuous checking of overhead contact lines feeding electrically driven railroad vehicles.

An apparatus adapted to slide along the overhead wires to be checked for varying diameters and possible defects and to move transversely to follow said wires. It includes a support in which at least one piezo-electric cell is adapted to engage the wire with the interposition of a layer of water or the like viscous liquid flowing preferably along a closed circuit. The cell transmits signals through a transformer or condenser to indicating or recording instruments.

---

The present invention has for its object the continuous checking of overhead lines feeding electric railways with a view to ascertaining the thickness of the wires throughout their length and to detecting their defects such as craters, cracks, notches or crevices.

As a matter of fact, the friction of a pantograph bow or trolley arm collector on the wires feeding the driving motors leads to a wear which is increased furthermore by the passage of current between the wire and such current-collecting means. This results in a reduction of the cross-section of the wire and also of its height in a direction perpendicular to the surface produced by friction.

Standard data have been given out by the railway authorities in order to ensure maximum possibilities of use of the wires, consistent with safety in operation and therefore it is essential to check periodically the remaining wire thickness. Hitherto said remaining wire thickness was measured manually by means of micrometers or of apparatus operating in accordance with the same principle or else of templates of a suitable shape.

However such measurements can be executed only at those points where both sides of the wire can be reached. On the other hand, they are performed manually under very special conditions by reason of the difficulties to be overcome in order to reach the wire to be checked. Therefore only a few points can be actually visited. This prior method is expensive and imperfect and allows only a few points to be taken into account when it is desired to ascertain the remaining cross-section of the wire throughout its length whereas said cross-section may vary considearbly and shows defects at a point which has not been checked which may cause a breaking of the wire at such a point.

There exist, it is true, continuous measuring systems relying on similar principles and resorting to a reference plane defined by two points on the wire diameter while a plunger piston carries a roller, a ball or a shoe engaging the flat worn surface of the wire. The modifications in the location of the plunger piston are transformed into electric magnitudes which when amplified are applied to the winding of a glavanometer of the dial or pen type, said galvanometer shows or records the differences measured defining the remaining wire thickness. Such a method would be efficient if the diameter of the wire were constant which is however never the case by reason of the manufacturing allowances which require a gauging for each elementary length and furthermore by reason of the various deposits which may form on the wires and of the presence of attachments and also of deformations of the wires and of the slope of the securing grooves with reference to the flat worn surface all of which causes detrimentally affect the accuracy of the measurements.

The present invention has for its object to cut out these drawbacks and it covers a checking apparatus comprising a suitably shaped guide adapted to maintain the wire in front of a cell carrying one or more piezo-electric crystals connected with one or more supersonic transmitters and receivers, the acoustic coupling between the contact surface of the wire and that of the supersonic cell being ensured in a manner known per se by a more or less viscous liquid.

The invention shows furthermore the following optional features:

The guide is constituted by a frame carrying four horizontal rollers and two slideways provided with balls engaging the transverse grooves of a support whereby the guide forms a carriage adapted to move freely in a transverse direction so as to follow the zig-zag alignment of the wire to be checked while said frame carries a rocking block forming a support for the piezo-electric transmitters and the upper surface of which is provided with a groove at the bottom of which the supersonic cell or cells lie; the block provided with said groove is interchangeable so as to match the apparatus with the requirements of the checking of the different wire portions and to be replaceable in the case of wear, the oscillatory axis of the block being parallel with the wire to be checked so that the flat section of the wire may face the axis of the supersonic cell or cells and be perpendicular thereto;

A recess for the coupling liquid is provided between the supersonic cell or cells and the contacting surface of the wire the level being maintained at a constant height by suitable means and the overflow being recovered through ports formed to either side of the recess;

A main container is provided which is connected with the measuring means and the coupling liquid is transferred into said container through the agency of a pump, said liquid being recovered through said ports as provided by the reduced pressure prevailing in said container under the action of the pump, which allows the operation to be performed within a closed circuit by means of a single pump;

The pump is connected with the carriage so as to be actuated by the reciprocation of the latter;

The guide includes two auxiliary guiding blocks located ahead of or behind said oscillating block and provided with grooves guiding the wire to be checked, the spindle carrying the oscillating block being fitted in said guiding blocks;

The system including the guiding blocks and the oscillating block is pivotally carried by a vertical shaft rigid with the carriage;

The grooves in the guiding blocks as also in the oscillating block are defined laterally and possibly along their bottom by suitably shaped guiding rollers;

The guiding rollers of the oscillating block are fitted on sloping spindles and assume a frusto-conical shape so that their operative generating lines are substantially parallel so as to ensure a frictionless guiding of the wire which cuts out any possible vibrations ascribable to said guiding;

Collapsible sloping surfaces which are suitably controlled are pivotally carried by the shaft carrying the oscillating block and housed in corresponding recesses formed in the guiding blocks so as to control the engagement and disengagement of the wire in the grooves;

A container for the coupling liquid is provided in the lower section of the guide together with an endless tape passing through said liquid and between the wire to be checked and the supersonic cell, said tape progressing in unison with the checking apparatus whereby the coupling liquid is fed onto the contacting point between the wire and the supersonic cell; said tape is guided by three rollers of which two are located substantially at the same level as the supersonic cell ahead and to the rear of said cell whereas the third roller is immersed inside the coupling liquid;

The guide and supersonic cell may be both subjected to the same voltage as the wire to be checked;

The guide being subjected to the voltage of the wire to be checked the supersonic cell may be at ground voltage;

The signals are transmitted through a transformer and/or an insulating and filtering condenser from the supersonic cell to a transmitting receiver, the outputs of which feed the dial of a measuring instrument and/or recording means carrying one or more tracks;

The support of the guiding carriage is incorporated with an arrangement similar to a pantograph adapted to be moved nearer or away from the wire to be checked according to requirements, said carriage being furthermore provided with driving means including a clutch and adapted to shift said arrangement into contact with the wire and to stop when said wire is in contact with the outer edges of said guiding grooves, said wire being introduced into the grooves through the agency of the collapsible sloping surfaces;

Two or more carriages are fitted each inside a support on the same pantograph and each carriage cooperates with a corresponding wire to be checked.

In order to provide a proper understanding of the invention two embodiments thereof will be described hereinafter with further detail, reference being made to the accompanying drawings wherein:

FIG. 1 is a diagrammatic longitudinal cross-section of a preferred embodiment of the invention;

FIG. 2 is a transverse diagrammatic cross-sectional view thereof;

FIG. 3 is a plan view of the same embodiment;

FIG. 4 is a diagrammatic cross-sectional transverse view of a further embodiment;

FIG. 5 is a longitudinal cross-section of the embodiment illustrated in FIG. 4;

FIG. 6 illustrates a system of two wire checking apparatus.

As shown in FIGS. 1 to 3, the checking apparatus includes an oscillating block 1 inside which is provided a central recess 27 filled with a more or less viscous liquid 14 such as water for instance, while two recesses 26 located on the upstream and downstream sides respectively of the recess 27 are adapted to recover the liquid flowing out of the recess 27. Two rollers 8a and 8b revolving round sloping axes 32 form together a guiding groove 8 for the wire to be checked (FIG. 2). In order that the flat bottom of the groove 8 may remain constantly in contact with the flat surface of the wire to be checked, whatever may be the angle formed by said flat surface with a horizontal plane, the block 1 is carried by shafts 28 the ends of which are housed in elongated openings 31a formed in the sliders 31 which latter are carried in their turn in housings 1a formed in the block 1. Thus, the pivotal center of the block lies away on the axis of the wire 5 to be checked. The sliders are adapted to urge the block 1 against the wire with a predetermined force independent of the force exerted by the actual pantograph. The rollers 8a and 8b are adapted to reduce friction and to cut out the vibrations which may arise. Said rollers 8a, 8b may be interchanged and their size is such that they match the cross-section of the wire to be checked. However it is obvious that the groove 8 may be constituted by mere stationary guides. The pivotal shafts 28 are carried in a support 22 rigid with the carrier plate 2; the latter forms a supporting frame associated with the four rollers 3 running in the grooves 4a formed in the guiding rails 4. It should be remarked that in a modification which is not illustrated, the system including the support 22 and the oscillating block 1 may be fitted on a vertical shaft rigid with the supporting plate 2 so that said system may rock not only round a horizontal axis extending forwardly but also round a vertical axis so as to match all the directions assumed by the wire. This is highly advantageous, chiefly when two guiding blocks 23 are provided ahead of and behind the oscillating block 1 (FIG. 3). Said guiding blocks play two parts, to wit: they provide on the one hand a lateral guiding of the carriage formed by the checking apparatus moving transversely along the guiding rails 4 and on the other hand they allow the automatic engagement of the wire 5 along the grooves. As a matter of fact, the guiding blocks 23 are provided each with a collapsible sloping surface 24 adapted to pivot round the shaft 28. When inoperative, it is entirely collapsed within its housing inside the corresponding guiding block 23 and when the wire 5 reaches the area 36 the sloping surface 24 is raised out of its housing and causes the wire 5 to slide along a path leading to the groove between the stationary guides 25 and the groove 8 of the wire checking apparatus. The rocking of the sloping surface is controlled by a solenoid, which is not illustrated, through the agency of a link 29. In order to reduce the friction inside the guiding blocks 23, needle rollers 30 are provided which are housed at the bottom of the groove underneath the level of the stationary guides 25. The guiding blocks are also interchangeable and may be replaced in case of wear or in order to make them match the cross-section of the wire 5.

As illustrated in FIG. 6, the pantograph 35 may be provided with double guiding rails 4 adapted to carry each a checking apparatus, each of which is connected through a belt 34 with the driving motor 32 through the agency of guiding pulleys 33 and of a frictional coupling which is not illustrated. Thus, the checking apparatus may be shifted as required along the guiding rails 4 so as to reach the wire to be checked 5. Double or even treble control apparatus are provided for the case where the electric wires are double or treble as occurs in certain areas.

In the case of FIGS. 4 and 5, the arrangement includes a block 1 forming both a guide and a container and secured to a carrier plate 2. Within the removable cover 1a there is provided a groove 8 adapted to receive the wire 5 to be checked while sloping surfaces located ahead and to the rear of said groove further the positioning and release of the wire when controlled from a remote point by a reciprocating manual control or any other suitable means. The cover 1a forms a part adapted to be worn and is readily interchangeable and it is thus an easy matter to make the apparatus match the different wire diameters. The block 1 includes inwardly as in the case of FIGS. 1 to 3 the measuring cells 17 equipped with one or more piezoelectric crystals connected by a coaxial cable 9 with one or more supersonic transmitting and receiving means 11 through a transformer and/or an insulating and filtering condenser 10. The acoustic coupling between the contacting surface of the wire 5 and that of the measuring cell 17 is obtained by the more or less viscous liquid 14 which is conveyed to the coupling point by an endless tape 6 made of a material pervious for supersonic waves. Said tape 6 is guided by two rollers 15 located to the front and rear respectively of the measuring cell 17 and by a roller 16 immersed in the liquid bath 14. The tape 6 is normally driven frictionally along with the wire 5. But it is possible to provide a positive drive through an electric motor for instance. The signals collected are transmitted to the dial of a measuring instrument 13 and to recording means 12.

The measuring operation of the apparatus disclosed relies on the principle of multiple echoes, that of is of the repeated reflection of a train of supersonic waves on a surface: the interval elapsed between two echoes is measured and its value is compared with that of intervals between ulterior echoes. Said method consists thus in a succession of comparative measurements of the same magnitude, that is of the distance between the flat surface of the wire and the apex of the curve defined by the wire on the side opposed to said flat surface.

An important advantage of said method resides in the fact that it detects any defect between the latter and the flat surface such as a crack, a notch, a crater or the like which may be detrimental to the resistance of the wire.

A further advantage of the invention resides in the fact that the measurements are executed while the wire is energized as provided by the transformer and/or insulating and filtering condenser 10 so that only supersonic frequencies can pass, which allows operation as well with A.C. or D.C., the measuring cell 17 being subjected either to the voltage of the wire or else to ground voltage.

In the embodiment according to FIGS. 1 to 3, the coupling liquid 14 is carried in the recess 27 between the supersonic cell 17 and the contacting surface on the wire 5; the level in said recess 27 remains constant as provided by the pump 19 controlled mechanically by the transverse shifting of the block 1 following the misalignment of the wire 5 or else by the longitudinal shifting along the actual wire. In this case, an auxiliary container 18 is provided and the block 1 is then fed as mentioned hereinabove by the pump 19 which delivers through the channel 21 the liquid which is recovered out of the lateral recesses 26 through the channels 20 under the action of the reduced pressure in the container 18.

What I claim is:

1. An apparatus for checking the overhead wires feeding electric railway vehicles with a view to measuring the thickness of the wires and their possible defects, said apparatus comprising a cell including at least one piezoelectric crystal, a guiding member carrying said cell and adapted to maintain the cell in substantially contacting relationship with the wire, receiving and transmitting means connected with the cell, a sheet of liquid of a predetermined viscosity coupling elastically the cell with the wire portion engaged by the latter; a chamber filled with the viscous liquid and fitted over the cell facing the location of the cooperating wire section, a container filled with said liquid and feeding said chamber, a pump controlling the circulation of said liquid from the container towards the chamber and thence back into the container, and means whereby the transverse movements of the guiding member control the pump.

2. An apparatus for checking the overhead wires feeding electric railway vehicles with a view to measuring the thickness of the wires and their possible defects, said apparatus comprising a cell including at least one piezoelectric crystal, a guiding member carrying said cell and adapted to maintain the cell in substantially contacting relationship with the wire, receiving and transmitting means connected with the cell, a sheet of liquid of a predetermined viscosity coupling elastically the cell with the wire portion engaged by the latter; a support provided with transverse slideways, rollers running in said slideways and carrying the guiding member to allow its shifting transversely of the cooperating wire, an interchangeable oscillating block carried by the guiding member and provided with an upper groove engaged by the block, the oscillatory axis of the block being parallel with the location of the wire, auxiliary guiding blocks secured to the front and rear of the first-mentioned oscillating block respectively and provided with guiding grooves for the wire to be checked, a longitudinal rotary shaft extending between said auxiliary blocks and forming the oscillatory axis of the oscillating block, and a vertical shaft rigid with the guiding member and on which the oscillating and guiding blocks are revolvably secured and guiding frusto-conical rollers defining at least partly the grooves in the oscillating and guiding blocks, the axes of said frusto-conical rollers sloping with reference to the direction of the wire.

3. An apparatus for checking the overhead wires feeding electric railway vehicles with a view to measuring the thickness of the wires and their possible defects, said apparatus comprising a cell including at least one piezoelectric crystal, a guiding member carrying said cell and adapted to maintian the cell in substantially contacting relationship with the wire, receiving and transmitting means connected with the cell, a sheet of liquid of a predetermined viscosity coupling elastically the cell with the wire portion engaged by the latter; a support provided with transverse slideways, rollers running in said slideways and carrying the guiding member to allow its shifting transversely of the cooperating wire, an interchangeable oscillating block carried by the guiding member and provided with an upper groove engaged by the block, the oscillating axis of the block being parallel with the location of the wire, auxiliary guiding blocks secured to the front and rear of the first-mentioned oscillating block respectively and provided with guiding grooves for the wire to be checked, and a longitudinal rotary shaft extending between said auxiliary blocks and forming the oscillatory axis of the oscillating block, and collapsible sloping members pivotally carried with reference to the oscillating block fitted in the guiding blocks and controlling the engagement and disengagement of the wires in the grooves.

References Cited

UNITED STATES PATENTS

| | | | |
|---|---|---|---|
| 2,545,101 | 3/1951 | Meunier | 73—71.5 X |
| 3,028,751 | 4/1962 | Joy | 73—67.8 |
| 3,122,661 | 2/1964 | Joy | 73—67.8 X |
| 3,327,523 | 6/1967 | Kelemencky et al. | 73—715 |
| 3,350,925 | 11/1967 | Coy | 73—71.5 |
| 3,504,534 | 4/1970 | Mandula | 73—71.5 |

RICHARD C. QUEISSER, Primary Examiner

A. E. KORKOSZ, Assistant Examiner

U.S. Cl. X.R.

73—67.8